Dec. 30, 1941.  E. L. McCARTHY  2,267,832

LENS SYSTEM

Filed July 30, 1940

INVENTOR
Edward L. McCarthy
BY Brown & Seward
ATTORNEYS

Patented Dec. 30, 1941

2,267,832

UNITED STATES PATENT OFFICE 2,267,832

LENS SYSTEM

Edward L. McCarthy, Jersey City, N. J., assignor to The Perkin-Elmer Corporation, New York, N. Y., a corporation of New York Application July 30, 1940, Serial No. 348,461

12 Claims. (Cl. 88—57)

This invention relates to lens systems and more particularly to a lens system suitable for use as an eyepiece in telescopic systems (such, for instance, as telescopes, range finders, periscopes, and the like), or as an objective in periscopic systems, or for similar purposes.

It is known that a useful form of lens system may be constructed of two convergent elements axially separated by a small air space, one element being a single lens and the other a cemented triplet. This system is referred to as an "orthoscopic" eyepiece.

It is an object of the present invention to provide a lens system transmitting a larger field of view and being more compact than previous systems of comparable simplicity and working characteristics.

It is another object of the present invention to provide a lens system having a certain desirable state of correction, as will hereinafter appear, in combination with a wide field of view, while at the same time having a maximum number of flat surfaces on the individual lenses comprising the eyepiece, thereby reducing their cost of manufacture.

Figure 1:
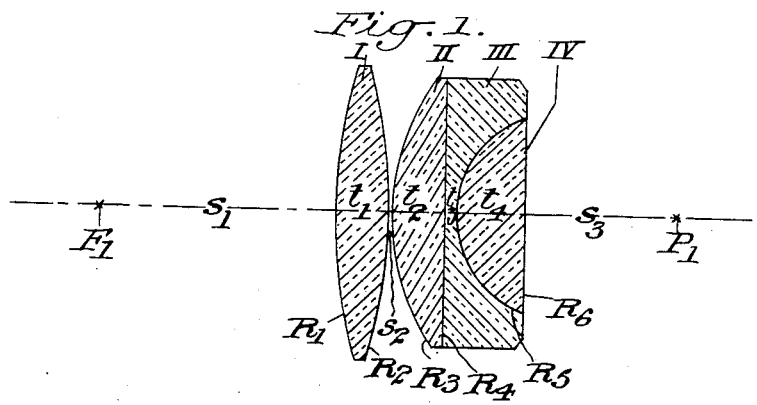

Further objects and advantages of the present invention will appear from the description following:

Practical embodiments of my invention are represented in the accompanying drawing in which Fig. 1 represents an axial section of a preferred form of this lens system designed for a field of 57°.

Figure 2:
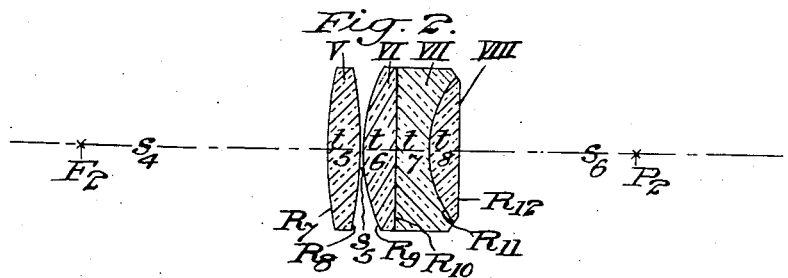

Fig. 2 represents an axial section of another form of this lens system designed for a considerably smaller field but having a greater eye relief than is possessed by the form shown in Fig. 1.

The object planes of the two constructional examples are indicated by the focal points $F_1$ and $F_2$ respectively, and the exit pupil points for infinitely distant entrance pupils by $P_1$ and $P_2$ respectively. The radii of curvature of the lens surfaces are designated by $R$ and the axial thicknesses of the lenses by $t$. Axial air spaces are designated by $S$. Individual lens elements in Fig. 1 are numbered from I to IV inclusive, while those in Fig. 2 are V to VIII inclusive. The following table shows the constructional data for the embodiments represented by the drawing, wherein the lens systems have an equivalent focal length of 100 units:

Fig. 1

| Thicknesses and axial separations | Radii of surfaces | Refractive index $N_D$ | The Abbe number $V$ |
|---|---|---|---|
| $S_1 = 95.0$ | $R_1 = +214.4$ | | |
| $t_1 = 20.8$ | | I 1.6170 | 55.0 |
| | $R_2 = -214.4$ | | |
| $S_2 = 0.2$ | | | |
| | $R_3 = +91.6$ | | |
| $t_2 = 20.8$ | | II 1.6170 | 55.0 |
| | $R_4 = \infty$ | | |
| $t_3 = 5.2$ | | III 1.7200 | 29.3 |
| | $R_5 = +41.5$ | | |
| $t_4 = 26.6$ | | IV 1.6053 | 43.6 |
| | $R_6 = \infty$ | | |
| $S_3 = 60.4$ | | | |

Fig. 2

| Thicknesses and axial separations | Radii of surfaces | Refractive index $N_D$ | The Abbe number $V$ |
|---|---|---|---|
| $S_4 = 98.2$ | $R_7 = +215.8$ | | |
| $t_5 = 13.8$ | | V 1.6170 | 55.0 |
| | $R_8 = -215.8$ | | |
| $S_5 = 0.2$ | | | |
| | $R_9 = +92.9$ | | |
| $t_6 = 13.4$ | | VI 1.6170 | 55.0 |
| | $R_{10} = \infty$ | | |
| $t_7 = 13.4$ | | VII 1.7200 | 29.3 |
| | $R_{11} = +42.1$ | | |
| $t_8 = 11.5$ | | VIII 1.6053 | 43.6 |
| | $R_{12} = \infty$ | | |
| $S_6 = 70.8$ | | | |

It will be seen that each of these lens systems is composed of two convergent elements axially separated by an air space which is not more than one eighth of the focal length of the system and which is preferably less. The front element, i. e., the element on the object side, is a single lens, and the rear element is a cemented triplet, each of the lenses of which may possess one flat face.

The focal length of the front element lies between four-thirds and seven-thirds of the focal length of the system.

The distance of the exit pupil from the nearest glass surface is comparatively great. In the embodiment of the invention represented in Fig. 2, which is designed for the moderate total field of view of 30°, this distance is seven-tenths of the focal length when the entrance pupil is at an infinite distance. The axial distance from the object plane to the front element is unusually large, and, in the embodiment represented in Fig. 2, this distance is 98% of the focal length.

In the lens system represented in Fig. 1 the total field of view transmitted amounts to at least 57° when the entrance pupil is infinitely distant. In this embodiment, and with this entrance pupil condition, the exit pupil lies at an axial distance from the nearest glass surface equal to six-tenths of the focal length of the system. The object plane in this embodiment lies at an axial distance from the front element equal to 95% of the focal length of the system.

The compactness which is achieved through this invention is well exemplified in the lens system shown in Fig. 1. Although, as noted above, this system is designed to transmit a 57° field of view, the total axial space from the first surface of the front element to the last surface of the rear element does not exceed three-fourths of the focal length of the system.

Moreover, the obtaining of a field of view of 57° is believed to be a unique feature in a lens system of so little complexity.

This lens system which I have invented has a relatively small Petzval sum, excellent correction for coma, for lateral and longitudinal chromatic aberration, and for the curvature of field necessary to compensate such an additional lens system as, for example, a telescope objective, with which this lens system might efficiently be used.

It should be noted that this system may be made, as in the examples given, to have at least three flat surfaces out of the eight individual lens surfaces employed. The presence of these flat surfaces allows the eyepiece to be manufactured in less time and at less expense than if the surfaces were curved in a manner similar to the already well known "orthoscopic" eyepiece.

While I have specifically set forth preferred embodiments of my invention wherein the front element is a single lens, a reduction in the amount of distortion present could be made by making the front element more complex, and such would not depart from the spirit of this invention. Such a modification might involve the substitution for the front element detailed herein of a cemented pair of individual lenses possessing unlike mean indices.

In the use of this invention with other glasses it should be noted that the denser the glasses employed, the wider the field of view made possible.

Although I have shown and described two embodiments which this invention may take, many variations are possible and will immediately suggest themselves to those skilled in this particular art. I do not wish to be limited to the details herein set forth, but intend to include in my invention all modifications which fall within the scope of the following claims:

What I claim is:

1. A lens system of the character described comprising a convergent front element and a convergent rear element axially spaced therefrom, said rear element being a triplet composed of three cemented lenses each having a single flat refracting surface, the other refracting surfaces of said element being spherical.

2. A lens system of the character described comprising a convergent front element and a convergent rear element axially spaced therefrom, said rear element being a triplet composed of three cemented lenses each having one flat refracting surface, the distance between the said elements being less than one-eighth of the focal length of the said system.

3. A lens system of the character described comprising a convergent front element and a convergent rear element axially spaced therefrom, said rear element being a triplet composed of three cemented lenses each having one flat refracting surface, said front element having a focal length lying between four-thirds and seven-thirds of the focal length of the said system.

4. A lens system of the character described comprising a convergent front element and a convergent rear element axially spaced therefrom, said rear element being a triplet having at least one flat refracting surface, the distance apart of the said elements being at the most one-eighth of the focal length of the said system, and said front element having a focal length lying between four-thirds and seven-thirds of the focal length of the said system.

5. A lens system according to claim 4, said triplet being composed of three cemented lenses, two of the said lenses each having one flat refracting surface.

6. A lens system according to claim 4, said triplet being composed of three cemented lenses each having one flat refracting surface.

7. A lens system according to claim 4, said triplet being composed of three cemented lenses each having one flat refracting surface, and said front element being a single lens.

8. A lens system of the character described comprising a convergent front element and a convergent rear element axially spaced therefrom, said rear element consisting of three cemented lenses having the radii of curvature of their surfaces so chosen that the first and third lens surfaces are convex toward light proceeding through the system from front to rear and the second and fourth surfaces are flat, the distance apart of the said elements being at most one-eighth of the focal length of the system, and said front element being a single lens of focal length lying between four-thirds and seven-thirds of the focal length of the system.

9. A lens system of the character described comprising a convergent front element and a convergent rear element axially spaced therefrom, said rear element consisting of a plurality of cemented lenses having the radii of curvature of their surfaces so chosen that none of the said surfaces is concave toward light proceeding through the system from front to rear, each of said cemented lenses having one flat refracting surface, the distance apart of the said elements being at most one-eighth of the focal length of the system, and said front element having a focal length lying between four-thirds and seven-thirds of the focal length of the system.

10. A lens system according to claim 9, there being three cemented lenses in the rear element.

11. A lens system of the character described comprising two axial components, the second of which is a cemented triplet, and having substantially the numerical data set forth in the following table wherein $R_1 R_2$ . . . designate the radii of the successive lens surfaces counting from the front, $t_1 t_2$ . . . the axial thicknesses of the individual elements, and $S_2$ the axial air separation, the system having an equivalent focal length of 100 units:

| Radius | Thickness or separation | Refractive index $N_D$ | V value |
|---|---|---|---|
| $R_1 = +214.4$ | | | |
| $R_2 = -214.4$ | $t_1 = 20.8$ | 1.6170 | 55.0 |
| $R_3 = +91.6$ | $S_2 = 0.2$ | | |
| $R_4 = \infty$ | $t_2 = 20.8$ | 1.6170 | 55.0 |
| $R_5 = +41.5$ | $t_3 = 5.2$ | 1.7200 | 29.3 |
| $R_6 = \infty$ | $t_4 = 26.6$ | 1.6053 | 43.6 |

12. A lens system of the character described comprising two axial components, the second of which is a cemented triplet, and having substantially the numerical data set forth in the following table wherein $R_7 R_8 \ldots$ designate the radii of the successive lens surfaces counting from the front, $t_5 t_6 \ldots$ the axial thicknesses of the individual elements, and $S_5$ the axial air separation, the system having an equivalent focal length of 100 units:

| Radius | Thickness or separation | Refractive index $N_D$ | V value |
|---|---|---|---|
| $R_7 = +215.8$ | | | |
| $R_8 = -215.8$ | $t_5 = 13.8$ | 1.6170 | 55.0 |
| $R_9 = +92.9$ | $S_5 = 0.2$ | | |
| $R_{10} = \infty$ | $t_6 = 13.4$ | 1.6170 | 55.0 |
| $R_{11} = +42.1$ | $t_7 = 13.4$ | 1.7200 | 29.3 |
| $R_{12} = \infty$ | $t_8 = 11.5$ | 1.6053 | 43.6 |

EDWARD L. McCARTHY.